(No Model.)

D. BROOKS, Jr.
Method of Introducing Telegraph Wires into Pipes.

No. 235,735. Patented Dec. 21, 1880.

Witnesses:
A. P. Grant,
W. F. Kircher

Inventor:
David Brooks, Jr.,
by John A. Wiedersheim,
ATTORNEY.

N. PETERS, PHOTO-LITHOGRAPHER, WASHINGTON, D.C.

UNITED STATES PATENT OFFICE.

DAVID BROOKS, JR., OF PHILADELPHIA, PENNSYLVANIA.

METHOD OF INTRODUCING TELEGRAPH-WIRES INTO PIPES.

SPECIFICATION forming part of Letters Patent No. 235,735, dated December 21, 1880.

Application filed June 8, 1880. (No model.)

*To all whom it may concern:*

Be it known that I, DAVID BROOKS, Jr., a citizen of the United States, residing in the city and county of Philadelphia, and State of Pennsylvania, have invented a new and useful Improvement in Means of Introducing Telegraph and other Wires into Pipes and Insulating the Same, which improvement is fully set forth in the following specification and accompanying drawings, in which—

Figure 1:
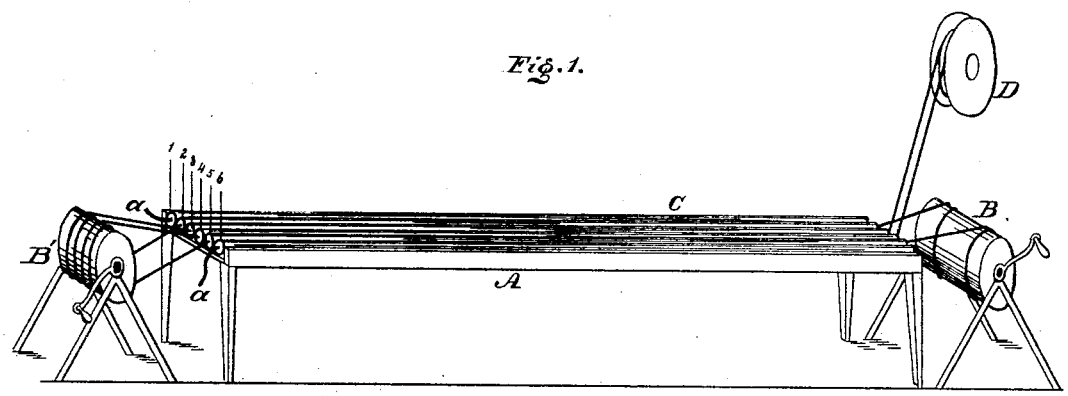
Figure 2:
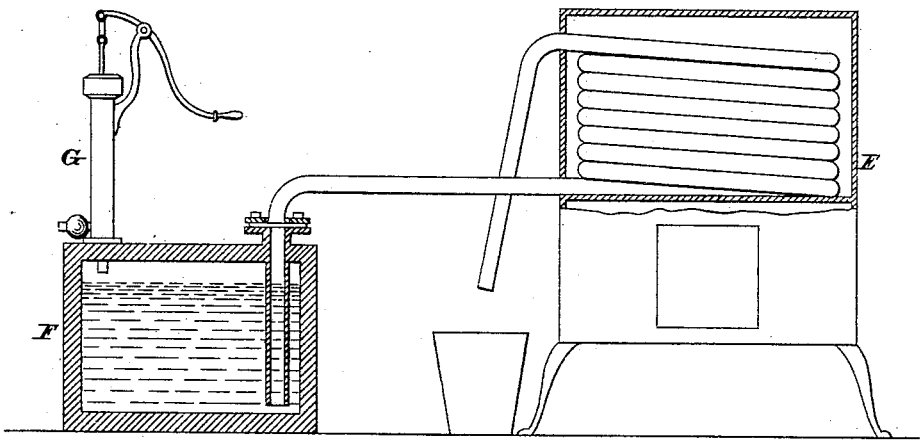
Figure 3:

Figure 1 is a perspective view of one part of the apparatus embodying my invention. Fig. 2 is a vertical section of another part thereof. Fig. 3 is a view of the pipes and inserted wires or cables.

Similar letters of reference indicate corresponding parts in the several figures.

This invention relates to the insulation of wires incased in pipes; and it consists in a new method of introducing them into such pipes and effecting such insulation, as hereinafter set forth and claimed.

Referring to the drawings, A represents a table, and B B' represent drums properly mounted at the opposite ends of said table.

The pipes C, for the reception of telegraph, telephone, and other wire, have each inserted in them, during or subsequent to their manufacture, an iron wire, a, and are placed on the table A, their length being preferably great—say three hundred feet—six of them being shown in the present case. The wire to be introduced into the pipe C is wound in two lengths on a drum or wheel, D, properly mounted and located relatively to the table A.

The two ends of the wire on the reel D are connected to the adjacent ends of the wires of the pipes 3 4, the other ends of the latter wires being connected to the drum B'. By rotating the drum B' the wires of the pipes 3 4 are drawn through said pipes and wound, say, with two turns, around the drum B', the wires of the reel being thereby drawn through the pipes 3 4. The ends of the wire of the reel are then attached to the wires of the pipes 2 5, and the latter wires are connected to the drum B, and thereby pulled through by rotating said drum B, bringing with them the wires from the reel. The wires of the pipes 1 6 are now connected to the drum B' and ends of the wires of the reel, and by rotating said drum B' the wires of 1 6 and of the reel are run through said pipes 1 6.

It will thus be seen that the several separated pipes have a continuous length of wire or cable within them, and said pipes may be straightened out, their contiguous ends being forced together by dies or other means and welded, thus making a continuous length of pipe, which, being of lead, composition, or similar metal, permits it to be coiled on the reel D, the loose wires previously in the separated pipe having been entirely removed by the length of wire from the reel. The coil is then placed in a hot-air chamber, E, and one end attached to an air-tight vessel, F, containing insulating fluid or composition and having an air-pump, G, communicating with its interior.

By operating the pump pressure is exerted on the fluid of the vessel F, whereby air is expelled from the coil and the insulating fluid or composition forced through it. When this insulation is completed the coil is detached from the vessel F, and both ends of the coil capped or closed, the coil, with its inclosed and insulated wire or cable, then being ready to be laid.

Having thus described my invention, what I claim as new, and desire to secure by Letters Patent, is—

The method of incasing telegraph-wires into pipes, consisting in the following steps: attaching the two ends of a continuous wire to wires within two pipes, then winding the latter wires on a reel till said ends are drawn through the pipes, then drawing these ends similarly through successive pairs of pipes, and, finally, uniting the pipes to form a continuous insulating-tube for the wire.

DAVID BROOKS, JR.

Witnesses:
JOHN A. WIEDERSHEIM,
W. F. KIRCHER.